(12) United States Patent
Daute

(10) Patent No.: US 8,168,571 B2
(45) Date of Patent: May 1, 2012

(54) LUBRICANT COMBINATIONS

(75) Inventor: Peter Daute, Beverstedt (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 586 days.

(21) Appl. No.: 10/590,593

(22) PCT Filed: Feb. 17, 2005

(86) PCT No.: PCT/EP2005/001592
§ 371 (c)(1),
(2), (4) Date: Jun. 13, 2007

(87) PCT Pub. No.: WO2005/082991
PCT Pub. Date: Sep. 9, 2005

(65) Prior Publication Data
US 2007/0298986 A1  Dec. 27, 2007

(30) Foreign Application Priority Data
Feb. 26, 2004 (DE) .......... 10 2004 009 895

(51) Int. Cl.
*C10M 169/04* (2006.01)
*C10M 159/08* (2006.01)
*C10M 105/36* (2006.01)
*C10M 105/38* (2006.01)

(52) U.S. Cl. .......... 508/491; 508/465; 508/583

(58) Field of Classification Search .......... 508/465, 508/110, 508, 583, 491
See application file for complete search history.

(56) References Cited

U.S. PATENT DOCUMENTS

| 3,479,309 A | | 11/1969 | Hecker et al. | |
|---|---|---|---|---|
| 3,875,069 A | * | 4/1975 | Worschech et al. | 508/482 |
| 4,637,887 A | * | 1/1987 | Worschech et al. | 508/486 |
| 5,889,102 A | * | 3/1999 | Haack et al. | 524/494 |
| 6,383,992 B1 | * | 5/2002 | Garmier et al. | 508/491 |
| 6,818,689 B1 | * | 11/2004 | Lindner | 524/296 |
| 7,071,343 B2 | | 7/2006 | Daute et al. | |
| 7,488,838 B2 | | 2/2009 | Daute et al. | |
| 2003/0096132 A1 | | 5/2003 | Richardson | |
| 2003/0096713 A1 | * | 5/2003 | Schnur et al. | 508/192 |
| 2004/0014851 A1 | * | 1/2004 | Dohi et al. | 524/115 |

OTHER PUBLICATIONS

Brand et al., U.S. Appl. No. 11/779,942, filed Jul. 19, 2007.
Kurt Worschech, Lubricants for PVC English Translation, copyright 1986, pp. 570-595, Carl Hanser Verlag.

* cited by examiner

*Primary Examiner* — James Goloboy
*Assistant Examiner* — Pamela H Weiss
(74) *Attorney, Agent, or Firm* — Smith Moore Leatherwood LLP; Philip P. McCann

(57) ABSTRACT

A lubricant composition for thermoplastic processing including at least one natural fat and/or oil with an iodine value below 10 and at least one lubricant different from the natural fat and/or oil is provided. A method for processing thermoplastics including incorporating into a thermoplastic polymer a lubricant composition including at least one natural fat and/or oil with an iodine value below 10 and at least one lubricant different from the natural fat and/or oil, and processing the thermoplastic polymer is also provided.

18 Claims, No Drawings

LUBRICANT COMBINATIONS

RELATED APPLICATIONS

This application is a national phase filing under 35 U.S.C. § 371 of International Application No. PCT/EP2005/001592 which has an International filing date of Feb. 17, 2005, and which designated the United States of America and which claims priority to German Application No. 102004009895.6, filed Feb. 26, 2004, the entire disclosures of which are hereby incorporated herein by reference.

FIELD OF THE INVENTION

This invention relates generally to thermoplastics and, more particularly, to lubricant combinations for the processing of thermoplastics. The present invention also relates to the use of natural fats and/or oils with iodine values below 10 as lubricants for thermoplastics.

BACKGROUND INFORMATION

In the processing of thermoplastics, lubricants are added as processing aidFEDFs. On the one hand, the lubricants are capable of reducing the friction between plastic particles which makes the plastics easier to melt and promotes the formation of a homogeneous flowable melt. Lubricants acting in this way are also commonly referred to as internal lubricants.

On the other hand, lubricants used in the processing of plastics are capable of reducing the adhesion of the plastic melt to hot surfaces of machine parts or to the walls of the molds. It is assumed that the lubricants which, after their incorporation in the plastic, migrate from the plastic to the surface on account of their limited compatibility reduce adhesion. Lubricants acting in this way are also known as external lubricants or as "mold release agents".

In principle, the use of the lubricants also has a considerable bearing on the morphology, homogeneity and surface qualities of the plastic products.

Whether an additive acts as internal or external lubricant depends on many factors, more particularly on its structure and on the nature of the plastic. In many cases, internal and external lubricating effects may even be developed alongside one another. Initial observations on lubricants in PVC and their effect as internal and external lubricants can be found in the overview in Becker/Braun, Kunststoffhandbuch Vol. 2/1, Carl Hanser Verlag, 1986, pp. 570-595.

Known lubricants for plastics include, for example, fatty acids, fatty alcohols, fatty acid esters, fatty acid complex esters, wax esters, dicarboxylic acid esters, amide waxes, metal soaps, montan waxes, hydrocarbon waxes or oxidized hydrocarbons.

Despite their ecological and economic advantages, however, natural fats and oils have never been widely used as lubricants in the production of plastics because they act too extremely as external lubricants, i.e. they barely reduce the internal lubricating effect between the plastic particles, so that a homogeneous melt flow is not obtained, and at the same time they exude and cause transparency problems because of their incompatibility.

Where such natural fats and oils have been used in the past, the plastic parts obtained had "fisheyes" and, in addition, were not transparent.

The problem addressed by the present invention was to provide lubricant combinations based on ecologically highly compatible natural fats and oils which would not have any of the known disadvantages of natural fats and oils. Rather, the invention would provide lubricant combinations which would have the positive properties of the standard lubricants used hitherto and which would still be at least partly replaced by compounds based on natural fats and oils without any significant change in those positive properties.

The problem stated above has been solved by using natural fats and oils with iodine values below 10 in admixture with typical lubricants in the lubricant combinations. Surprisingly, lubricant combinations such as these show the positive properties of the typical lubricants for plastics although they have been partly replaced by natural fats and oils with iodine values below 10.

Thus, above all, lubricant combinations of dicarboxylic acid fatty acid esters, more particularly distearyl phthalate, as more of an internal lubricant in PVC in combination with natural fats and oils having iodine values below 10, more particularly hydrogenated tallow, are comparable in their internal lubricating effect with the dicarboxylic acid fatty acid esters on their own.

SUMMARY OF THE INVENTION

Briefly described, according to an aspect of the invention, a lubricant composition for thermoplastic processing includes (a) at least one natural fat and/or oil with a iodine value below 10; and (b) at least one lubricant different from the natural fat and/or oil of component (a).

According to another aspect of the invention, a method for processing thermoplastics includes the steps of: (i) incorporating into a thermoplastic polymer a lubricant composition comprising (a) at least one natural fat and/or oil with an iodine value below 10 and (b) at least one lubricant different from the natural fat and/or oil of component (a); and (ii) processing the thermoplastic polymer.

DETAILED DESCRIPTION OF THE INVENTION

Accordingly, the present invention relates to lubricant combinations for thermoplastics containing
a) natural fats and oils with iodine values below 10 and
b) standard lubricants for thermoplastics different from a).

The present invention also relates to the use of natural fats and oils with iodine values below 10 as lubricants with internal and external lubricating properties for thermoplastics, preferably for polar plastics.

Thermoplastics

Basically, there are no restrictions with regard to the thermoplastics. Thermoplastics selected from the group consisting of polyethylene, polypropylene, polyethylene terephthalate (PET), polycarbonate, polyamide, polyester, polystyrene and copolymers and polyvinyl chloride are preferred. These thermoplastics may be stabilized, pigmented, filled with fillers or modified, such as the rubber-modified high-impact polypropylene.

The following are examples of suitable plastics:
homopolymers of an α-olefin containing 2 to 8 carbon atoms, copolymers of two corresponding α-olefins, preferably copolymers of ethylene, ethylene homopolymers, such as HDPE (high-density polyethylene), LDPE (low-density polyethylene), VLDPE (very-low-density polyethylene), LLDPE (linear low-density polyethylene), MDPE (medium-density polyethylene), UHMPE (ultra high molecular polyethylene), VPE (crosslinked polyethylene), HPPE (high-pressure polyethylene); isotactic polypropylene; syndiotactic polypropylene; metallocene-catalyzed polypropylene, high-impact polypropylene, random copolymers based on ethylene and propylene, block copolymers based on ethylene and propylene; homopolymers based on 1-butylene, 1-pentylene, 1-hexylene, 1-octylene, isobutylene, 2-methyl-1-butylene, 3-methyl-1-pentylene, 4-methyl-1-pentylene, 2,3-dimethyl-1-butylene, 2-ethyl-1-butylene and mixtures thereof.

copolymers of ethylene with 1-butylene, 1-hexylene, 1-octylene and 4-methyl-1-pentylene.

ethylene/vinyl acetate copolymers, ethylene/ethyl acetate copolymers, ethylene/acrylate copolymers and mixtures thereof.

ethylene/propylene rubber (EPDM), including diene-modified (EPR), styrene/butadiene/styrene copolymers (SBS), styrene/ethylene/butyl-ene/styrene copolymers (SEBS) and mixtures thereof.

halogen-containing plastics, more particularly homopolymers of vinyl compounds, for example vinyl chloride.

Natural Fats and Oils With Iodine Values Below 10/Component a)

According to the invention, the natural fats and oils must have an iodine value below 10, preferably below 8 and more particularly between 0.1 and 5.

The iodine value was determined by the method described in DGF C/V 11 d.

Such fats and oils can occur naturally or may be obtained by hydrogenation of natural fats and oils with a relatively high percentage content of unsaturated fatty acids and hence a relatively high iodine value. One example of a naturally occurring fat and oil with iodine values below 10 is the coconut oil obtainable according to harvest and region of cultivation, the fatty acid composition of this natural oil of course being variable. Only natural coconut oil with iodine values below 10 is suitable for the purposes of the invention.

Other suitable natural fats and oils with iodine values below 10 are obtainable by hydrogenation of the double bonds of the unsaturated fatty acids in natural fats and oils by methods known per se. Natural oils and fats suitable for hydrogenation include palm oil, palm kernel oil, coconut oil, olive oil, rapeseed oil from old and new plants, sunflower oil from old and new plants, linseed oil, peanut oil, cottonseed oil, coriander oil, meadowfoam oil, lard oil, lard, bovine tallow and fish oil, coriander oil, chaulmoogra oil, linseed oil, meadowfoam oil or fish oil, but especially hydrogenated bovine tallow. Both the hydrogenated fats and oils with iodine values below 10 and the basic natural fats and oils which have still to be hydrogenated are commercially available. Hydrogenated tallow is preferably present as component a) in the lubricant combinations.

Other Typical Lubricants/Component b)

Besides the natural fats and oils with iodine values below 10 essential to the invention, at least one other lubricant typical of thermoplastics which is different from a) is present, being selected for example from $C_{12}$-24 fatty acids, $C_{12}$-24 fatty alcohols, esters of $C_{12-24}$ fatty acids and $C_{12-24}$ fatty alcohols (so-called wax esters), esters of $C_{12-24}$ fatty acids and polyhydric alcohols containing 4 to 6 hydroxyl groups (so-called polyol esters), dicarboxylic acid esters of dicarboxylic acids and $C_{12-24}$ fatty alcohols and complex esters of dicarboxylic acids, polyols and monocarboxylic acids. The standard lubricants mentioned may be used both individually and in admixture with one another.

Suitable $C_{12-24}$ fatty acids are both native and synthetic, linear saturated compounds of this class. If fatty acid mixtures are used, they may contain small quantities of unsaturated fatty acids. Examples of suitable fatty acids are lauric, tridecanoic, myristic, pentadecanoic, palmitic, margaric, stearic, behenic and lignoceric acid. Fatty acids containing hydroxyl groups, such as 12-hydroxystearic acid, are also suitable. Fatty acids such as these can be obtained from naturally occurring fats and oils, for example through lipolysis at elevated temperature and pressure and subsequent separation of the fatty acid mixtures obtained, optionally followed by hydrogenation of the double bonds present. Technical fatty acids are preferably used here. They are generally mixtures of different fatty acids of a certain chain length range with one fatty acid as the main constituent. $C_{12-18}$ fatty acids individually or in admixture are preferably used.

The $C_{12-24}$ fatty alcohols are mostly linear saturated representatives of this class of substances which may be obtained inter alia from naturally occurring fats and oils by transesterification with methanol, subsequent catalytic hydrogenation of the methyl esters obtained and fractional distillation. Examples of such fatty alcohols are lauryl, myristyl, cetyl, stearyl and behenyl alcohol. These compounds may be used individually and in admixture with one another. Technical fatty alcohols are preferably used. They are normally mixtures of different fatty alcohols of a limited chain length range in which one particular fatty alcohol is present as the main constituent. Technical $C_{12-18}$ fatty alcohol mixtures are preferred.

Other suitable standard lubricants are wax esters, i.e. esters of $C_{12-24}$ fatty acids and $C_{12-24}$ fatty alcohols which preferably correspond to formula (I):

$$R^1CO\text{—}OR^2 \quad (I)$$

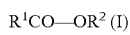

in which $R^1CO$ is a saturated and/or unsaturated acyl group containing 12 to 24 and preferably 12 to 18 carbon atoms and $R^2$ is an alkyl and/or alkenyl group containing 12 to 24 and preferably 12 to 18 carbon atoms. Typical examples are esters of lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof with lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, linoyl alcohol, linolenyl alcohol, elaeostearyl alcohol, arachyl alcohol, gadoleyl alcohol, behenyl alcohol, erucyl alcohol and brassidyl alcohol and technical mixtures thereof. Preferred wax esters are stearyl palmitate, stearyl stearate, stearyl isostearate, stearyl oleate, stearyl behenate, stearyl erucate, isostearyl palmitate, isostearyl stearate, isostearyl isostearate, isostearyl oleate, isostearyl behenate, isostearyl erucate, oleyl palmitate, oleyl stearate, oleyl isostearate, oleyl oleate, oleyl behenate, oleyl erucate, behenyl palmitate, behenyl stearate, behenyl isostearate, behenyl oleate, behenyl behenate, behenyl oleate and mixtures thereof. Stearyl stearate is particularly preferred as the wax ester. It is important in this regard to bear in mind that stearyl stearate is normally produced from technical starting materials which in turn are mixtures so that the ester is also a mixture.

The esters mentioned may be obtained by known methods of organic synthesis, for example by heating stoichiometric quantities of fatty acid and fatty alcohol to 180-250° C., optionally in the presence of a suitable esterification catalyst, such as tin grindings, and in an inert gas atmosphere, and distilling off the water of reaction.

Other suitable group b) lubricants are polyol fatty acid esters, i.e. esters of $C_{12-24}$ fatty acids and polyols containing 4 to 6 hydroxyl groups. The alcohol component may be selected, above all, from aliphatic polyols containing 4 to 12 carbon atoms, for example erythritol, pentaerythritol, dipentaerythritol, ditrimethylol propane, diglycerol, triglycerol, tetraglycerol, mannitol and sorbitol. These polyol esters may be full esters in which all the hydroxyl groups of the polyol are esterified with fatty acid. However, polyol partial esters containing one or more free hydroxyl groups in the molecule are also suitable: These fatty acid polyol esters may also be obtained by known methods of organic synthesis by esterification of the polyols with stoichiometric or sub-stoichiometric quantities of free fatty acids. Examples of such polyol fatty acid esters are the stearic acid and stearic acid/palmitic acid full esters of erythritol, pentaerythritol and diglycerol, the dilaurates of dipentaerythritol, ditrimethylolpropane, triglycerol, mannitol and sorbitol, the distearates of erythritol, pentaerythritol, dipentaerythritol and tetraglycerol and the so-called sesquiesters of pentaerythritol, dipentaerythritol, mannitol and sorbitol in whose production 1.5 mol fatty acid, more particularly palmitic and/or stearic acid, is used to 1 mol polyol. The polyol fatty acid esters mentioned are generally mixtures simply because of the particular starting materials used. Polyol fatty acid esters particularly suitable as group b) lubricants are pentaerythritol tetrastearate and/or dipentaerythritol hexastearate.

Other suitable group b) lubricants are complex esters which are also known per se from the prior art. In principle, the complex esters are produced from dicarboxylic acids, polyols and monocarboxylic acids. The following dicarboxylic acids may be used for the production of the complex esters: oxalic, malonic, succinic, glutaric, adipic, pimelic, suberic, azelaic, sebacic, nonanedicarboxylic, undecanedicarboxylic, eicosanedicarboxylic, maleic, fumaric, citraconic, mesaconic, itaconic, cyclopropanedicarboxylic, cyclobutanedicarboxylic, cyclopentanedicarboxylic, camphor, hexahydrophthalic, phthalic, terephthalic, isophthalic, naphthalic and diphenyl-o,o'-dicarboxylic acid. The following compounds are generally used as aliphatic polyols containing 2 to 6 hydroxyl groups: ethylene glycol, 1,2-propylene glycol, 1,3-propylene glycol, 1,4-butanediol, 2,3-butanediol, 1,5-pentanediol, 1,6-hexanediol, glycerol, trimethylolpropane, erythritol, pentaerythritol, dipentaerythritol, xylitol, mannitol and sorbitol. Suitable monocarboxylic acids are linear or branched, synthetic or native acids, for example lauric, myristic, palmitic, margaric, stearic, arachic, behenic, lignoceric, cerotic acid, montanic acid, oleic, elaidic, erucic, linoleic, linolenic and isostearic acid and mixtures of these acids, particularly those obtainable from natural fats and oils.

Preferred complex esters are produced from aliphatic dicarboxylic acids containing 4 to 8 carbon atoms, polyols containing 3 or 4 hydroxyl groups and aliphatic monocarboxylic acids containing 14 to 22 carbon atoms. Excellent results are obtained with complex esters of adipic acid, pentaerythritol and monocarboxylic acids containing 14 to 22 carbon atoms.

According to the invention, other suitable group b) lubricants are dicarboxylic acid esters of fatty alcohols containing 12 to 24 carbon atoms. Suitable dicarboxylic acids have already been mentioned by way of example in connection with the complex esters. Suitable fatty acids are the fatty acid already discussed above. Phthalic acid esters, more especially distearyl phthalate, are particularly preferred.

Other lubricants, which may be used individually or in combination, are hydrocarbon waxes melting at temperatures in the range from 70 to 130° C., oxidized polyethylene waxes, α-olefins, ethylenediamine distearate, montanic acid esters of diols, for example ethanediol, 1,3-butanediol and glycerol, mixtures of such montanic acid esters with unesterified montanic acids and metal soaps, more particularly salts of organic monocarboxylic acids with metals of the second main and/or secondary group of the periodic table, such as calcium soaps and zinc soaps.

In a particularly preferred embodiment of the invention, the natural fats and oils with iodine values below 10 are used in admixture with standard lubricants for thermoplastics belonging to group b) which is formed from the group of fatty acid esters of fatty alcohols (wax esters), dicarboxylic acid esters of fatty alcohols and/or polyol fatty acid esters.

Particularly preferred lubricant mixtures are mixtures of hydrogenated tallow and stearyl stearate or hydrogenated tallow and distearyl phthalate or hydrogenated tallow and pentaerythritol or hydrogenated tallow and dipentaerythritol hexastearate.

The natural fats and oils with iodine values below 10 (component a) and the other lubricants known from the prior art (component b) are generally used in a ratio by weight of 20:80 to 80:20, preferably 40:60 to 60:40 and more particularly ca. 50.

The natural fats and oils with iodine values below 10 are preferably blended with the other lubricant (component b) before it is added to the thermoplastics. The natural fats and oils with iodine values below 10 are advantageously melted with the other lubricant and then made up in the usual way, for example by spray crystallization.

In practice, the lubricant mixtures according to the invention are applied by addition to the thermoplastics to be processed in quantities of 0.01 to 10, preferably 0.05 to 5 and more particularly 0.1 to 3 parts by weight to 100 parts by weight of thermoplastic. The lubricant mixtures are preferably added to the melt formed during production of the thermoplastic or are applied to the plastic granules or powder at elevated temperatures.

The thermoplastics may contain additional additives. Examples of suitable additives are antistatic agents, antifogging agents, antioxidants, UV stabilizers, coupling agents, calendering aids, parting agents, lubricants, plasticizers, perfumes, flame retardants, fillers and agents for increasing thermostability (thermostabilizers).

The thermoplastics may readily be further processed by standard methods, for example by extrusion, pressing, rolling, calendering, sintering, spinning, blow moulding, foaming, injection moulding or processing by the plastisol method.

Particularly good effects are obtained with such plastics as polyamide, ABS, PC and PVC.

By using the natural fats and oils with iodine values below 10 together with standard lubricants, the antifriction properties and release effect in plastics such as these are excellent. In addition, the plastic melt shows uniform and rapid flow.

EXAMPLES

A) Production of the lubricant combinations according to the invention

In a glass beaker, 100 g stearyl stearate and 100 g hydrogenated tallow (IV=0.3) were heated to 80° C. and homogenized by stirring. The mixture was then left to cool in a metal tank (mixture I).

In a glass beaker, 100 g distearyl phthalate and 100 g hydrogenated tallow (IV=0.3) were heated to 80° C. and homogenized by stirring. The mixture was then left to cool in a metal tank (mixture II).

B) Production of the Dry Blends

B1-B3) Production of a PVC Dry Blend

In a Henschel mixer, a dry blend was produced from PVC powder and various additives as listed below (quantity of material=3 kg, heating temperature=120° C., subsequent cooling). The compositions are set out in the following Table:

| Example | B1 | B2 | B3 |
|---|---|---|---|
| PVC Evipol SH 6830 | 100 | 100 | 100 |
| Chalk Hydrocarb 95 T | 3 | 3 | 3 |
| Lead phosphite, dibasic | 2 | 2 | 2 |
| Lead stearate, 51% | 1 | 1 | 1 |
| Calcium stearate | 0.6 | 0.6 | 0.6 |
| Distearyl phthalate | 1.0 | — | — |
| Hydrogenated tallow | — | 1.0 | — |
| Mixture of hydrog. tallow and distearyl phthalate (mixture II) | — | — | 1.0 |

Example B3 corresponds to the invention.

B4-B5) Production of an Extrusion PVC Dry Blend

| Example | B4 | B5 |
|---|---|---|
| Vestolit P 1982 K | 100 | 100 |
| Chalk Omyalite 95 T | 4 | 4 |
| TiO$_2$ Kronos 220 | 4 | 4 |
| Stabilox ® CZE 2040 (CaZn stabilizer, Cognis) | 4 | 4 |
| Techn. stearic acid | 0.3 | 0.3 |
| Stearyl stearate | 0.5 | — |
| Mixture of hydrog. tallow and stearyl stearate (mixture I) | — | 0.5 |

Example B5 corresponds to the invention

C. Production of Ribbons

Dry blends B1) to B5) were extruded to a ribbon in a Weber twin-screw extruder (extrusion parameters: screw speed=15 r.p.m. (B1-B3), 25 r.p.m. (B4, B5); temperature=180° C.). The power consumed by the extruder, the machine load (in %), was evaluated as a measure of lubricant effectiveness.

| Example | Machine load (%) | Melt pressure (bar) |
|---|---|---|
| B1 | 71.3 | 362 |
| B2 | 57.9 | 313 |
| B3 | 70.9 | 354 |
| B4 | 50 | 231 |
| B5 | 51 | 231 |

Example B3 according to the invention shows that the machine load and melt pressure of the lubricant mixture according to the invention substantially correspond to those of the standard lubricant distearyl phthalate. By contrast, the use of hydrogenated tallow on its own is characterized by such a low machine load and high melt pressure that a homogeneous PVC melt flow is not obtained, so that inhomogeneous plastic parts are formed. Example 5 according to the invention produces an analogous result.

What is claimed is:

1. A composition, comprising
   A) a thermoplastic polymer selected from polyvinyl chloride, polyamide, polycarbonate, or acrylonitrile butadiene styrene; and
   B) a lubricant composition consisting essentially of:
      (a) a first component selected from natural coconut oil or a hydrogenated tallow with an iodine value below 10; and
      (b) a second component selected from a fatty acid ester of fatty alcohols, dicarboxylic acid esters of fatty alcohols, or a polyol fatty acid ester including wax esters.

2. The composition according to claim 1, wherein the natural coconut oil or a hydrogenated tallow have iodine values below 8.

3. The composition according to claim 1, wherein the natural coconut oil or a hydrogenated tallow have iodine values between about 0.1 and about 5.

4. The composition according to claim 1, wherein components (a) and (b) are present in a ratio by weight of 20:80 to 80:20.

5. The composition according to claim 1, wherein components (a) and (b) are present in a ratio by weight of 40:60 to 60:40.

6. The composition according to claim 1, wherein component (b) comprises stearyl stearate.

7. The composition according to claim 1, wherein component (b) comprises distearyl phthalate.

8. The composition according to claim 1, wherein component (b) comprises pentaerythritol tetrastearate.

9. The composition according to claim 1, wherein component (b) comprises dipentaerythritol hexastearate.

10. The composition according to claim 1, wherein component (a) comprises hydrogenated tallow.

11. The composition according to claim 4, wherein component (a) comprises hydrogenated tallow.

12. A method for processing thermoplastics, comprising the steps of:
   (i) incorporating into a thermoplastic polymer a composition consisting essentially of (a) a first component selected from natural coconut oil or a hydrogenated tallow with an iodine value below 10 and (b) one lubricant selected from fatty acid ester of fatty alcohols, dicarboxylic acid esters of fatty alcohols, or a polyol fatty acid ester including wax esters; and
   (ii) processing the thermoplastic polymer
      wherein the thermoplastic polymer is selected from polyvinyl chloride, polyamide, polycarbonate, or acrylonitrile butadiene styrene.

13. The method according to claim 12, wherein components (a) and (b) are present in a ratio by weight of 20:80 to 80:20.

14. The method according to claim 12, wherein component (a) includes hydrogenated tallow.

15. The method according to claim 12 wherein the natural fats and oils having iodine numbers below 10 are blended and melted together with the further lubricant prior to incorporation into the thermoplastic polymer.

16. The method according to claim 12 wherein the incorporation into the thermoplastic polymer takes place by means of spray crystallization.

17. The method according to claim 12 wherein the lubricant composition is added in an amount of from about 0.01 to about 10 parts by weight to 100 parts by weight of the thermoplastic polymer to be processed.

18. The method according to claim 12 wherein the lubricant composition is
   (a) added to the melt that is formed during the preparation of the thermoplastic polymer; or
   (b) applied to the plastics material granules or plastics material powder at an elevated temperature.

* * * * *

UNITED STATES PATENT AND TRADEMARK OFFICE
CERTIFICATE OF CORRECTION

PATENT NO. : 8,168,571 B2  Page 1 of 1
APPLICATION NO. : 10/590593
DATED : May 1, 2012
INVENTOR(S) : Peter Daute It is certified that error appears in the above-identified patent and that said Letters Patent is hereby corrected as shown below:

Column 3,

Line 54, "from $C_{12}$-24 fatty acids, $C_{12}$-24" should read -- from $C_{12-24}$ fatty acids, $C_{12-24}$ --.

Column 6,

Lines 19-20, "more particularly ca. 50." should read -- more particularly ca. 50:50 --.

Signed and Sealed this
Twelfth Day of June, 2012

David J. Kappos
*Director of the United States Patent and Trademark Office*